(12) United States Patent
Blair et al.

(10) Patent No.: US 6,809,833 B1
(45) Date of Patent: Oct. 26, 2004

(54) LATE BINDING OF DEVICE SETTINGS IN A HOST RASTER IMAGE PROCESSOR

(75) Inventors: Stuart R. Blair, San Francisco, CA (US); Peter S. MacLeod, Oakland, CA (US); Peter Mierau, Alamo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/259,983

(22) Filed: Mar. 1, 1999

(51) Int. Cl.$^7$ .......................... G06F 15/00; G06F 13/00
(52) U.S. Cl. ...................... 358/1.16; 358/1.15; 395/114; 395/115; 395/117; 709/321
(58) Field of Search .............................. 358/1.16, 1.15; 395/114, 117, 115; 709/321

(56) References Cited

U.S. PATENT DOCUMENTS

| | | | |
|---|---|---|---|
| 5,515,481 A | * 5/1996 | Pardo | 358/1.18 |
| 5,655,062 A | * 8/1997 | Tompkins et al. | 358/1.9 |
| 5,706,410 A | 1/1998 | Bagley et al. | |
| 5,713,032 A | * 1/1998 | Spencer | 715/515 |
| 5,796,411 A | * 8/1998 | Cyman et al. | 101/211 |
| 5,995,724 A | * 11/1999 | Mikkelsen et al. | 358/1.16 |
| 6,024,505 A | * 2/2000 | Shinohara | 400/605 |
| 6,091,507 A | * 7/2000 | Vatland et al. | 358/1.13 |
| 6,151,134 A | * 11/2000 | Deppa et al. | 358/1.15 |
| 6,560,621 B2 | * 5/2003 | Barile | 715/513 |
| 2001/0043355 A1 | * 11/2001 | Bando | 358/1.15 |
| 2001/0043358 A1 | * 11/2001 | Schwartz | 358/1.15 |
| 2001/0043376 A1 | * 11/2001 | Kumada et al. | 358/504 |

FOREIGN PATENT DOCUMENTS

EP   0 538 059   4/1993

OTHER PUBLICATIONS

PostScript Language Reference, third edition, Adobe Systems Incorporated.*
Windows 95 Secrets 3rd edition by Brian Livingston & Davis Straub.*
"The Single UNIX Specification, Version 2," 1997 The Open Group, downloaded from www.unix-systems.org/, 2 pgs.
Notes from Microsoft Programmer's Reference, "Interprocess Communication," 10 pgs.

* cited by examiner

Primary Examiner—Edward Coles
Assistant Examiner—Alan Rahimi
(74) Attorney, Agent, or Firm—Fish & Richardson P.C.

(57) ABSTRACT

A system adapts a host raster image processor to support a selected output device from a plurality of output devices by buffering, in a memory shared by a print driver and a host raster image processor and controlled by a status indicator, a print stream having one or more commands to customize the raster image processor and customizing the raster image processor using the commands to render a document on the selected output device.

46 Claims, 6 Drawing Sheets

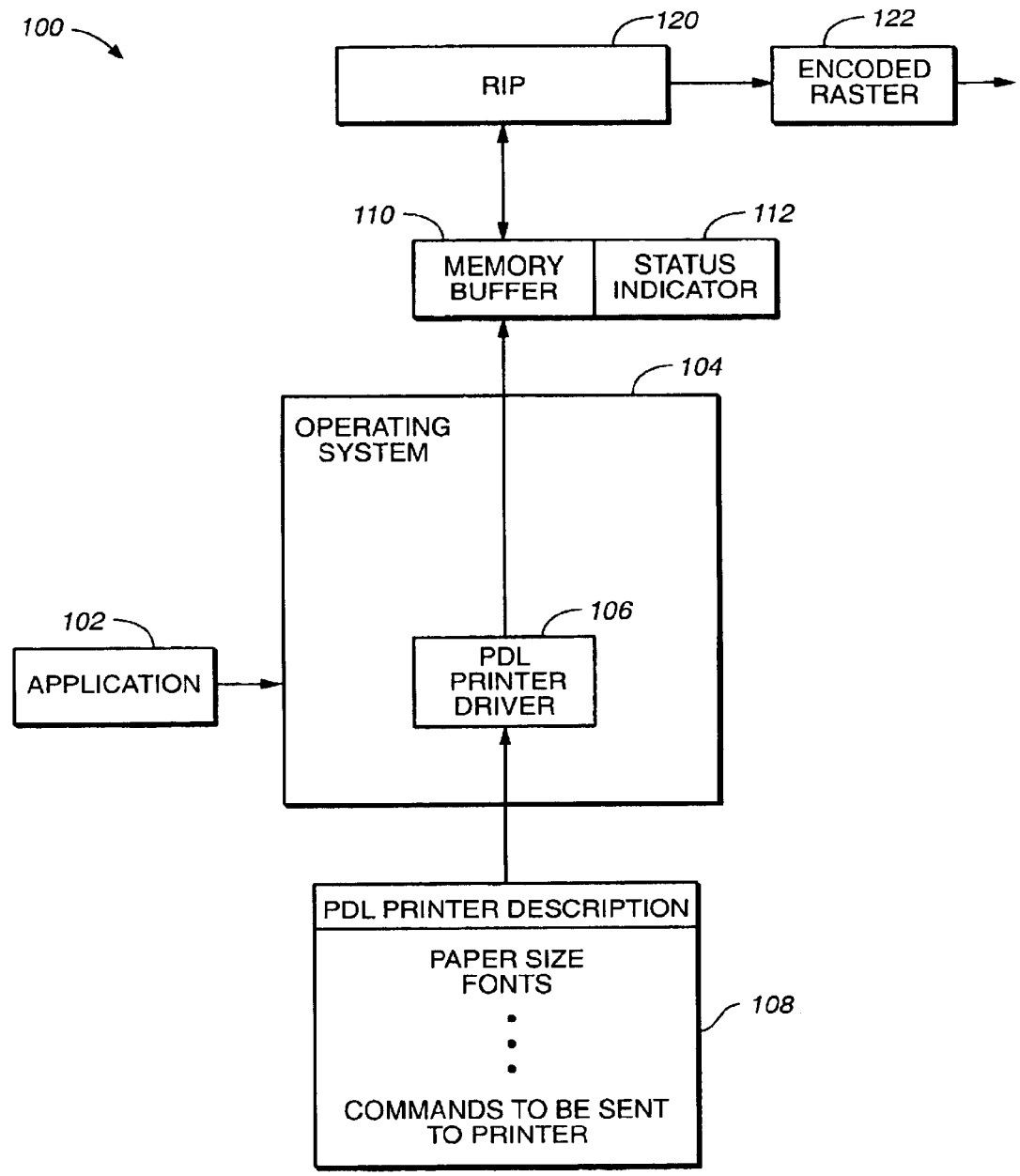
FIG._1

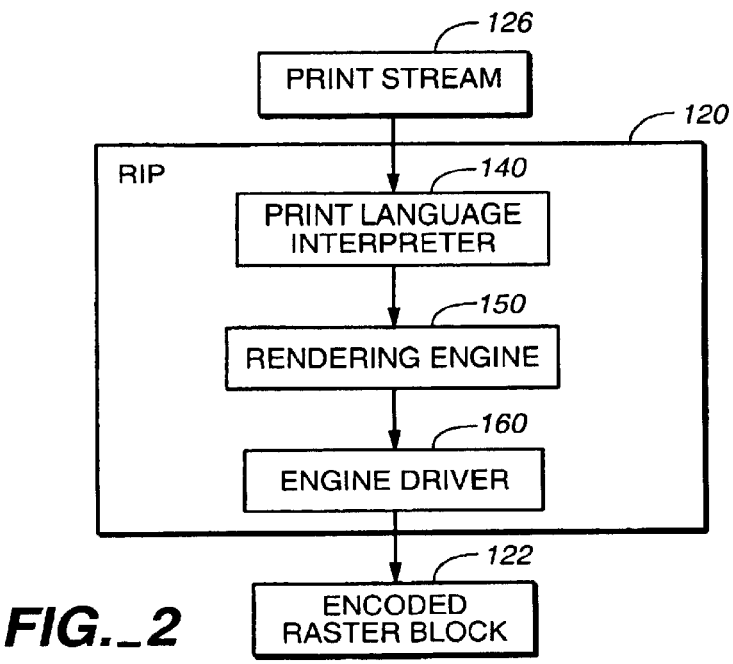
FIG._2
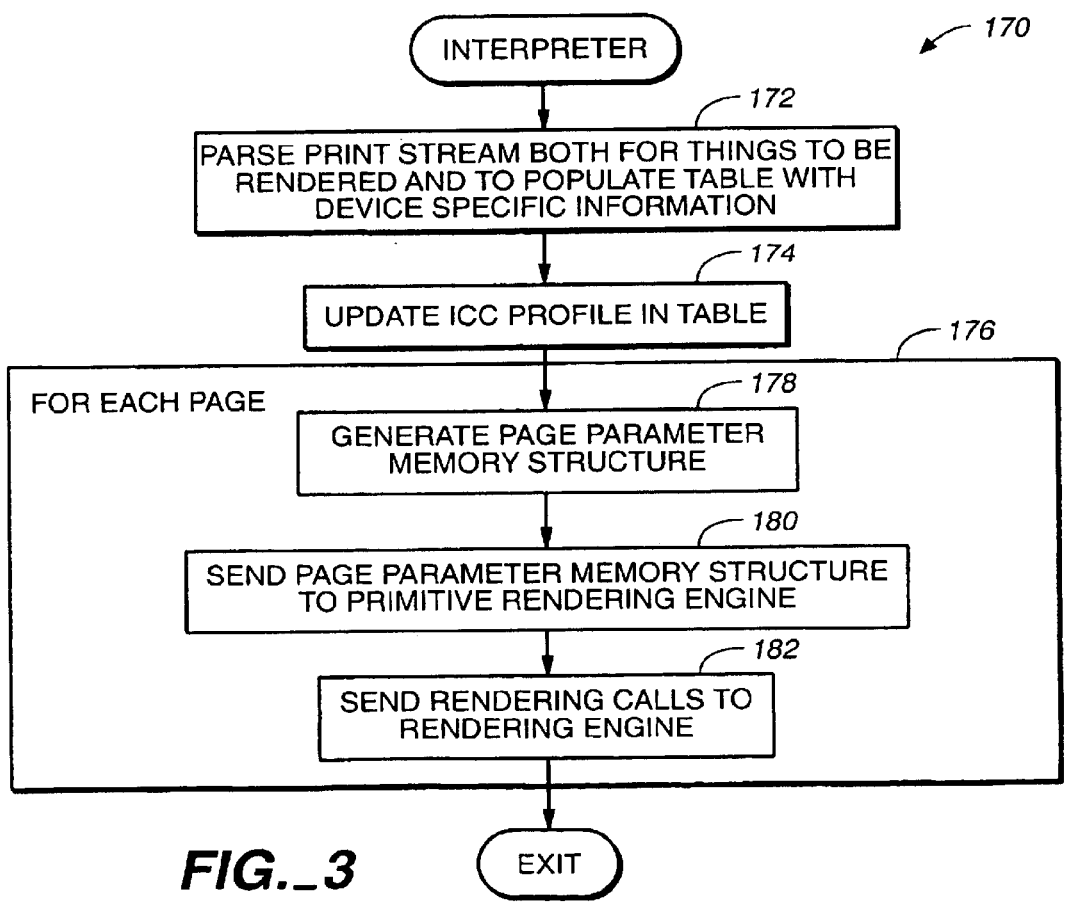
FIG._3

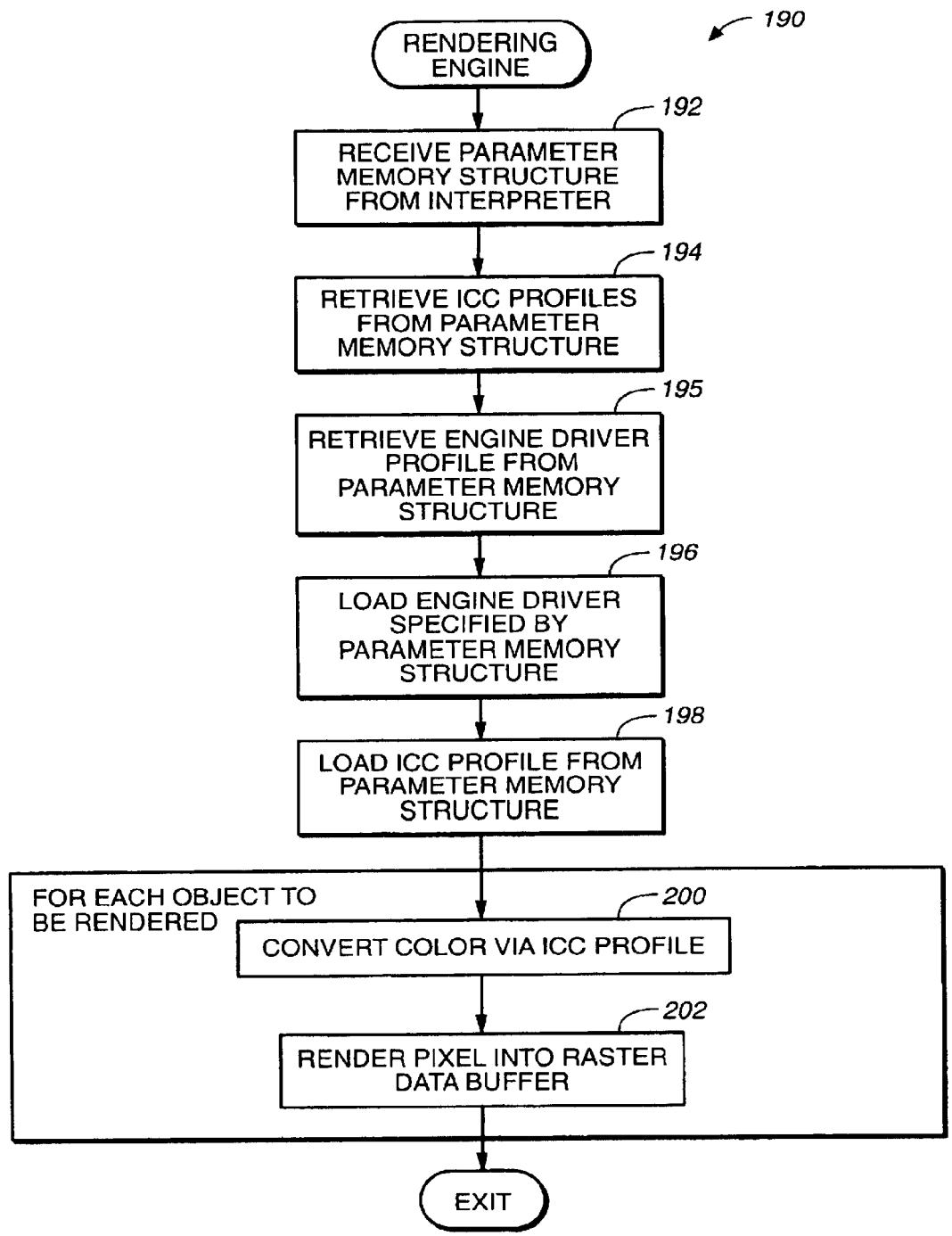
FIG._4

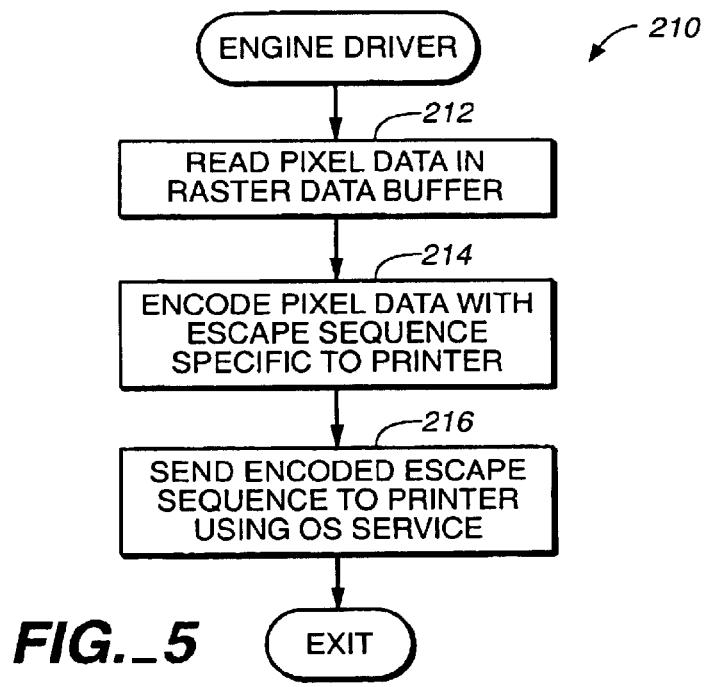
FIG._5
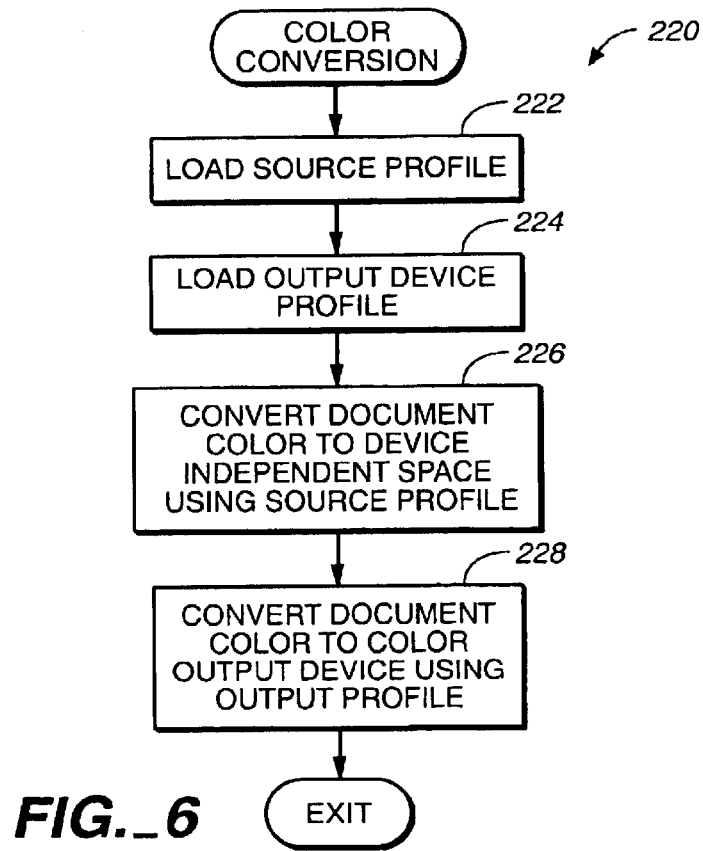
FIG._6

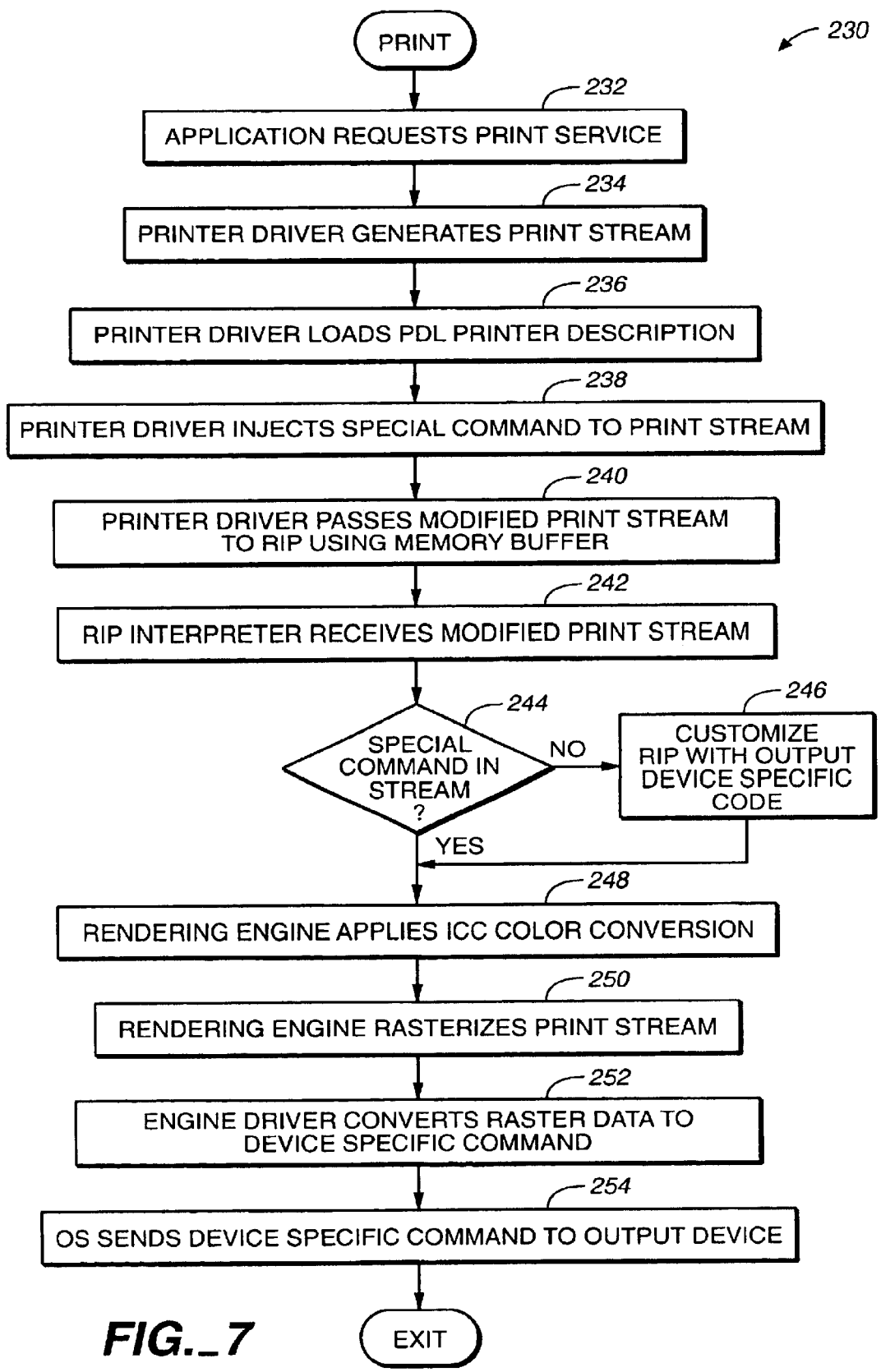
FIG._7

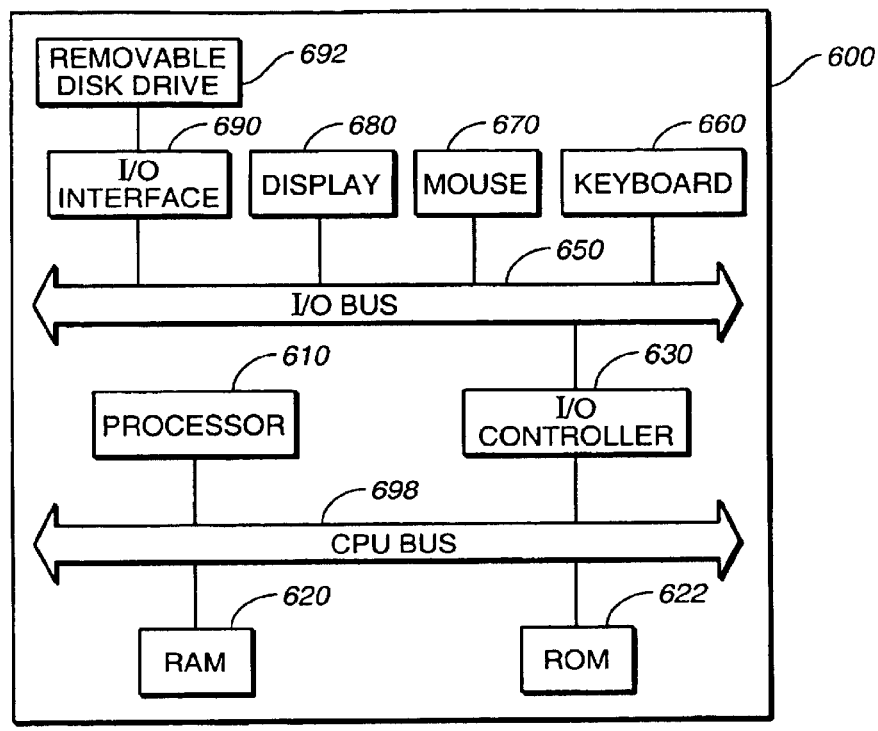
FIG._8
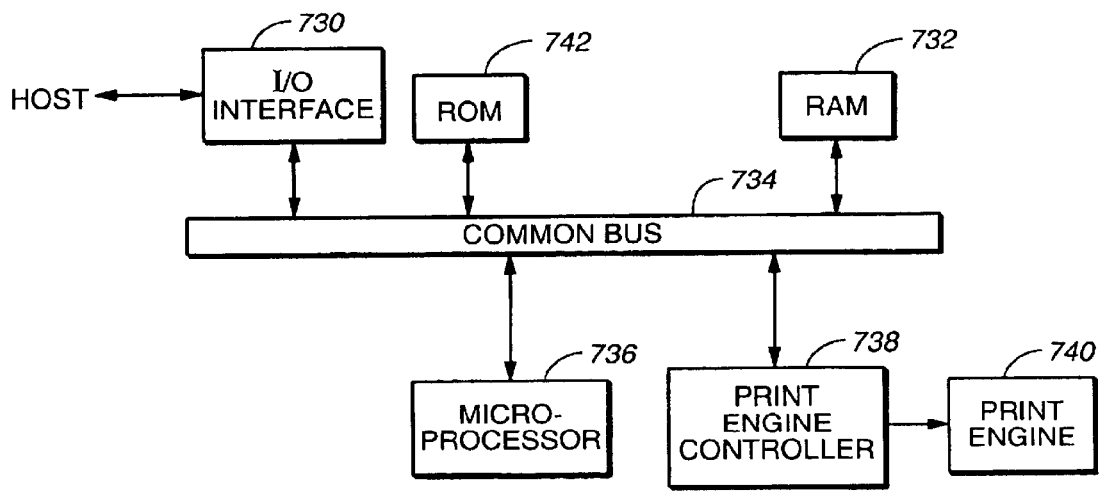
FIG._9

LATE BINDING OF DEVICE SETTINGS IN A HOST RASTER IMAGE PROCESSOR

BACKGROUND

The present invention relates generally to systems and methods for printing data from a computer application running on a host computer.

In many computer systems, it is common to represent and convey information to a user through digital images. These images may take a variety of forms such as alphanumeric characters and graphs and other pictorial representations. The digital images are conveyed to users on graphical rendering devices, such as video monitors, printers and the like. Typically, the digital images are stored in digital form, manipulated and then displayed on a monitor or printed on an output device such as a printer.

To provide flexibility and high quality output, printers capable of accepting page description languages were developed whereby a page with graphics, text, and images may be represented using successive commands of the page description language (PDL). In these printers, after receiving the page description language commands, a desired image is rasterized so that a print engine in the printer can generate the page by turning on or off individual dots or pixels across the printed page in a raster scan line.

One popular page description language is the PostScript® page description language available from Adobe Systems Incorporated of San Jose, Calif. The PostScript page description language is described in *PostScript Language Reference Manual*, Addison-Wesley (2d. ed. 1993).

Historically, printers that support the PostScript page description language have built-in computers which receive the PostScript page description language commands and interpret then rasterize the commands to raster form suitable for delivery to a marking engine for printing. The built-in computer generates a pixel pattern or bit-map image that includes raster-formatted data indicating intensities or colors for a two-dimensional matrix of pixels or dots.

Due to the increasing capability of processors used in host computers and the drive to lower overall system cost, the rasterization process can be shifted to a host computer (i.e., in this context, the computer on which the printing application is running). The host computer can include a raster image processor (generally implemented as a computer program) that converts the PDL data to raster data. The output of the host raster image processor is generally encoded with print control commands and data for a specific output device.

Generally, if the host computer executes a Microsoft Windows® operating system, the raster image processor (RIP) transfers data (print control commands and image data) to a spooler program. The spooler is essentially a data buffer that stores the commands and data in memory until they can be processed more extensively and sent to a printer. Spooling frees the underlying application program from having to wait for a printer to accept commands and data. Control commands and data are sent from the spooler to an output device over an I/O channel, which can be a serial or parallel printer interface or a network connection.

SUMMARY

A system adapts a raster image processor to support a selected output device from a plurality of output devices including buffering, in a shared memory controlled by a status indicator, a print stream having one or more commands for customizing the raster image processor and customizing the raster image processor using the commands to render a document on the selected output device.

Implementations of the invention may include one or more of the following. The print stream may be generated by an output device driver or by an application. The customizing step may include retrieving output device characteristics from an output device description file. Color conversion characteristics or engine driver information may be retrieved from the output device description file. Further, the invention may generate a page parameter memory structure for the selected output device; and customize a rendering engine using the page parameter memory structure. The customized rendering engine may generate raster output. A color profile specified in the output device description file or an engine driver specified in the output device description file may be loaded into the page parameter memory structure. The engine driver in turn generates an output for the selected output device. The output may be one or more escape sequences specific to the selected output device. Each escape sequence is a series of characters used to send special instructions to printers and other devices. The sequence includes an escape character which is combined with other characters.

The output of the engine driver may be sent to the selected output device using an operating system service call. The invention also selects the closest matching selected output device color in the output device in place of a color renderable by a final output device. The color selection may use one or more color profiles, which may be chained together. The profiles may be ICC profiles. The color selection operation may include converting the color space of the document into a device independent format; and converting the device independent format to the color space of the selected output device. The converting the device independent format to the color space of the selected output device step may use a profile associated with the selected output device. The print stream may be generated by generating one or more commands to customize the raster image processor to support a selected output device from the plurality of output devices; and inserting the one or more commands into the print stream.

Advantages of the invention include one or more of the following. The invention supports a plurality of output devices without requiring one raster image processor for each output device. Rather, a generic raster image processor is used which is dynamically configured by injecting special commands into a print stream to specify output device specific parameters to be loaded on the generic raster image processor. The dynamic customization of the generic raster image processor allows for the storage of a single copy of the generic raster image processor, thus reducing storage requirements associated with the multiplicity of raster image processors required to handle a plurality of output devices. Moreover, the invention allows the generic raster image processor to communicate at a high performance rate using memory-to-memory transfers.

By employing resources available in the host computer to prepare print data for printing by a print engine, the cost of the entire system is reduced. Further, the invention ensures that output-ready data is available to the print engine as needed for efficient full page printing.

The invention requires no change in the users' current workflow. Users can simply select press emulation settings and work and print as usual. Moreover, the workflow is extensible for the user who may choose to implement a color managed workflow and therein enjoy the benefits therefrom including softproofing, repurposability and consistency.

Other features and advantages of the invention will be apparent from the following description, including the drawings, and from the claims.

BRIEF DESCRIPTION OF THE DRAWINGS

FIG. 1 is a block diagram illustrating a system for rendering encoded raster output.

FIG. 2 is a block diagram of a raster image processor.

FIG. 3 is a flowchart illustrating the operation of a print language interpreter.

FIG. 4 is a flowchart illustrating the operation of a rendering engine.

FIG. 5 is a flowchart illustrating the operation of an engine driver.

FIG. 6 is a flowchart of a process for performing color conversion to render proper color rendering on an output device.

FIG. 7 is a flowchart illustrating a process for printing color on an output device.

FIG. 8 is a block diagram of a programmable information processing system suitable for the invention.

FIG. 9 is a schematic illustration of an output device.

DETAILED DESCRIPTION

Turning now to FIG. 1, a system 100 for generating encoded raster data output to be sent to an output device is shown. In the system 100, one or more applications 102 generate a print request directed at a particular selected output device. The print request is sent to an operating system 104 using an operating system call. The operating system 104 in turn directs the print request to a printer driver 106.

The printer driver 106 translates the operating system calls and generates a print stream that is stored in memory buffer 110. The print stream includes one or more commands for customizing a host raster image processor (RIP) 120 that is to render the print stream. The RIP executes on system 100 rather than on the output device. In one implementation a PostScript stream is generated that includes "set page device" commands that are used to customize the RIP. The print driver generates customized commands by accessing a printer description file 108 associated with the selected output device. The printer description file 108 contains device specific information such as paper size, fonts, and commands to be sent to the output device, among others. The print driver uses the device-specific information contained within the printer description file to form specific customization commands. In one implementation, all of the customization commands are of the form of PostScript set page device commands. The format for such is shown in Table A.

In one implementation, the printer driver 106 fills the memory buffer 110 with a portion of the print stream. The printer driver 106 then updates a status indicator 112 by sending a message (in one implementation through the operating system, i.e., Windows OS) to the RIP 120 to let the raster image processor 120 know that data is present in the memory buffer 110. The RIP 120 consumes the contents of the memory buffer 110 upon receipt of the message and generates raster data which is suitably encoded for the selected output device in an encoded raster file 122. The process repeats for each portion of the print stream. Alternatively, the buffer can be sized to store the entire print stream and the RIP may consume all or a predetermined amount of the buffer contents when the message is received.

In a second implementation running on an Apple Macintosh OS, the status indicator 112 is a flag in memory that is modified by the printer driver 106. The RIP 120 periodically monitors the status indicator 112, and clears it after processing the buffer contents.

Generally, the print stream contains a compact description of how each of the pages of the printed page will appear, including the text to appear on the page, the fonts to be used, the graphics or line art to be included, and the colors to be used. The RIP 120 interprets the print stream into one or more display lists. Each display list specifies objects and their corresponding positions on the page as well as color/density information and other characteristics. For example, the display list may specify the text information to be imaged and the position of the text on the page among others.

The RIP 120 then renders the display list instructions constructing a bitmap image of the page to be rendered in memory. For example, the RIP 120 can render the display list instructions forming a bitmap which is stored in a raster data buffer. For color imaging, the RIP may add color information to the raster information. Finally, the RIP encodes the bitmap into a format acceptable to a printer and sends the encoded data (encoded raster file 122) to the printer using an operating system service.

On a Windows-based computer, a spooler program may accept the encoded raster file 122 from the RIP 110 and store the encoded raster file 122 in a memory buffer (not shown) until it is sent to the selected output device (not shown). Alternatively, on a Macintosh computer, an operating system service is available for sending the encoded raster file 122 to the selected output device (not shown).

In the selected output device, a decoder converts the encoded bitmap image back to raster data. The decoder may also perform other operations such as separating color planes and separating control information from bitmap data. The actual conversion depends on the particularities of the printer's printing mechanism or printhead.

In one embodiment, the printer driver 106 is a PostScript driver. The PostScript driver takes in Graphical Drawing Interface (GDI), QuickDraw or PostScript (depending on platform and application) and outputs PostScript. The PostScript interpreter of the RIP 120, takes in the PostScript stream and outputs marking information and data to a rendering engine. The rendering engine renders the marking information and data producing bitmap data in rendered bands that can be transferred to an engine plug-in. The engine plug-in converts the data into an encoded form that can be interpreted by an output device.

Referring now to FIG. 2, the operation of the RIP 120 is shown. In FIG. 2, the print stream 126 from the memory buffer 110 (FIG. 1) is received by the RIP 120 and directed to a print language interpreter 140. The print language interpreter 140 interprets the page description language and sends the interpreted data to a rendering engine 150. The rendering engine 150 in turn generates a raster output, which is provided to an engine driver 160. The engine driver 160 packages the raster output in a format specified for the designated output device. The output of the engine driver 160 is an encoded raster block 122 which can be sent to the spooler for subsequent transmission to an output device.

FIG. 3 shows a process 170 executed by the print language interpreter 140 as pertaining to its handling of output device specific commands. The process 170 first parses the print stream, both for things to be rendered and to populate a table with device specific information (step 172). The table includes device specific information extracted from the print stream and may include either the specific information (ICC profiles, engine drivers and the like) or references thereto. The process 170 updates (loads) one or more International Color Consortium (ICC) profiles in the table (step 174).

Device profiles (ICC profiles) provide color management systems with the information necessary to convert color data between native device color spaces and device independent color spaces. The ICC divides color devices into three broad classifications: input devices, display devices and output devices. For each device class, a series of base algorithmic models are described which perform the transformation between color spaces. These models provide a range of color quality and performance results. The necessary parameter data to implement these models is described in the required portions on the appropriate device profile descriptions. This required data provides the information for a color management framework default color management module to transform color information between native device color spaces.

Turning back to FIG. 3, the process 170 performs block 176 for each page as follows. First, the process 170 generates a page parameter memory structure (step 178). The page parameter memory structure may be a table, a memory array, or other suitable data storage structure. The page parameter memory structure includes customizing information for the rendering engine, and in one implementation includes pointers to the particular drivers and profiles to be loaded in support of a designated output device. The page parameter memory structure can include references to ICC profiles, an engine driver, parameters for the specified engine driver, print quality, mode and media type information. The page parameter memory structure is then sent to the render engine (step 180) to customize the RIP to the specifics of the outputdevice (step 180). Once set up, rendering calls are simply forwarded to the render engine for rasterization (step 182). After all pages are processed, the process 170 exits.

Turning now to FIG. 4, a process 190 executed by rendering engine 150 is shown in,more detail with respect to its handling of output device specific commands. The process 190 receives a page parameter memory structure from the print language interpreter 140 (step 192). Next, ICC profiles (step 194) and engine driver specifications are retrieved from the page parameter memory structure (step 195). The process 190 then loads the engine driver (step 196) and ICC profile (step 198) that is specified by the parameter memory structure. Then, for each object to be rendered, the process 190 converts colors using the ICC profile (step 200) and renders pixels into a raster buffer (step 202) before exiting.

Turning now to FIG. 5, a process 210 which is executed by the engine driver 160 is illustrated. The process 210 first reads pixel data in the raster buffer (step 212). The pixel data is encoded with a suitable encoding such as an escape sequence that is specific to the output device (step 214). The encoded escape sequence is set to the printer using an operating system call (step 216).

For many output devices, a single rendered band buffer passes data between a spooler and an engine plug-in. Usually, the engine plug-in consumes the data in the band buffer before the next band is started, at which time the band buffer can be reused. However, for some output devices, it may be necessary for the engine plug-in to hold on to more than one band buffer at a time. In this case, the same band buffer may not be free for reuse after it is passed to the engine plug-in. To handle this situation, the engine plug-in may maintain a pool of band buffers.

In one embodiment, engine driver process 210 starts a print job by configuring a raster buffer, which is used to prerender bands of data. The process 210 processes one plane at a time, and each band in the plane is processed. When all planes have been process, the process 210 then exits.

Turning now to FIG. 6, a process 220 for performing color conversion to the output device is shown. The process first loads a source profile into memory (step 222). The source profile may include one or more standard profiles, including the USA commercial profile. Next, the process 220 loads an output device profile (step 224). The output device profile may be an inkjet printer profile or a dye sublimation printer profile, for example. The process 220 then converts the color space of the document to the color space of the source profile (step 226). This step converts the color space of the document to the color space of a device independent format. Next, the process 230 converts the document color to a corresponding color on the output device (step 228). Step 228 thus converts the device independent format back to the device dependent color of the output device.

Referring now to FIG. 7, a process 230 for rendering output on the output device is shown. First, an application requests print service from the operating system designating a particular output device (step 232). In response, a printer driver generates a print stream directed to the RIP (step 234). The printer driver loads a PDL file associated with the designated output device (step 236) and injects special commands into the print stream (step 238). The printer driver then passes the modified print stream to the RIP using a memory buffer (step 240). Next, the RIP interpreter receives and parses the modified print stream (step 242). The process 230 then checks whether one or more specialized commands are included in the stream (step 244). If so, the interpreter parses the command and customizes the RIP with output device specific code (step 246). This customization allows a generic RIP to be adapted to one of a plurality of output devices. From step 244 or 246, the process 230 then causes. the rendering engine to apply an ICC color conversion (step 248), which is discussed in more detail in FIG. 6. Next, the rendering engine rasterizes the print stream to produce raster data (step 250). The raster data is supplied to the engine driver which converts the raster data to device specific commands (step 252). Finally, the Operating System sends the device specific commands to the designated output device (step 254) before exiting.

The process of FIGS. 1–7 can be executed by a computer system. FIG. 8 illustrates one such computer system 600, including a CPU 610, a RAM 620, and an I/O controller 630 coupled by a CPU bus 698. The I/O controller 630 is also coupled by an I/O bus 650 to input devices such as a keyboard 660 and a mouse 670, and output devices such as a monitor 680.

FIG. 9 shows a typical printer driven by the computer system 600. Referring to FIG. 9, a printer embodying the invention includes an input/output (I/O) interface 730 for receiving raster input over a cable or network from the host computer which outputs the raster data to the common bus 734. Error messages and control information relating to the transfer of data is communicated back to the host via the I/O interface 730. As the raster data is received, it is stored in random access memory (RAM) 732 over the common bus 734. A microprocessor 736 on the common bus 734 provides the control for supplying the raster data to the print engine controller 738, which in turn passes the raster data to the electromechanical print engine 740 that applies the image to paper.

The program for the microprocessor 736 can be permanently stored in a read-only memory (ROM) 742. Input data and all other variable data can be stored in shared RAM 732.

A standard commercial microprocessor, such as the Motorola 68000 family or the Intel i960 family can be used as the microprocessor 736. The RAM 732 is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

TABLE A

Usage of Device-Specific Commands

The printer driver puts several device-specific commands in the print stream. Each command is a procedure call that stores data in a temporary Postscript dictionary.
The procedure might look like the following:
    /RipDict 30 dict def
    /AddRipRenderingInfo
    {
    RipDict begin def end
    }bind def
Once all of these commands have been sent, another special command is used to execute a Postscript setpagedevice to copy the data from the temporary dictionary into Postscript's setpagedevice dictionary. (A Postscript dictionary can be thought of as a table.) The procedure that does this step might look like the following:
    /ResetRenderingInfo
    {
    1 dict begin
    /DeviceRenderingInfo
    RipDict def
    Currentdict end setpagedevice
    }bind def
Later, the RIP copies the setpagedevice dictionary into a memory structure to pass to the Rendering Engine.

TABLE A-continued

Specificying the Engine Driver

To specify the engine driver to be used by the Rendering Engine, the command in the print stream might look like:
    /EngineDriver (ASIED00) AddRipRenderingInfo
The engine driver is specified as the name of a DLL (in this example ASIED00.DLL) to be loaded by the Rendering Engine.
Specifying the Source ICC Profile To specify the ICC profile to be used to characterize the colors in the source document being printed, the command might look like:
    /ProofProfile (SWOP.icm) AddRipRenderingInfo
The ICC profile is specified as the name of an ICC profile file (in this example SWOP.ICM) to be loaded by the Rendering Engine when it does color conversions.
Specifying the Output ICC Profile To specify the ICC profile to be used to characterize the colorspace of the output device, the command might look like:
    /PageDeviceName (EP800nbgp.icm) AddRipRenderingInfo
The ICC profile is specified as the name of an ICC profile file (in this example EP800nbgp.icm) to be loaded by the Rendering Engine when it does color conversions.

What is claimed is:

1. A method for printing a print stream, the method comprising:

providing a generic raster image processor and a printer driver in a host computer;

receiving a print request from an application, the print request designating a selected output device;

generating a print stream in response to the print request, the print stream containing a description of how a document will appear when printed including one or more of text to appear on a document, fonts to be used on a document, and graphics and line art to be included on a document;

the printer driver accessing device information about the selected output device from an output device description file associated with the selected output device, generating a customization command to configure the generic raster image processor for the selected output device based on the device information, and injecting the customization command into the print stream prior to the print stream being passed to the generic raster image processor;

storing the print stream including the customization command in a first memory buffer shared by the print driver and the generic raster image processor;

passing the print stream including the customization command to the generic raster image processor; and the generic raster image processor consuming the print stream including the customization command from the first memory buffer, loading an engine driver specified by the customization command, and generating raster image data output for the selected output device; and storing the generated raster image data output in a second memory buffer for further processing or until the generated raster image data output can be sent to the selected output device.

2. The method of claim 1, wherein the print stream is generated by the printer driver.

3. The method of claim 1, wherein the print stream is generated by an application.

4. The method of claim 1, wherein the device information includes color conversion characteristics.

5. The method of claim 1, wherein the device includes engine driver information about the engine driver.

6. The method of claim 1, wherein the generic raster image processor has a rendering engine, the method further comprising:
generating a page parameter memory structure for the selected output device; and
configuring the rendering engine using the page parameter memory structure.

7. The method of claim 6, wherein the raster image data output for the selected output device is generated using the configured rendering engine.

8. The method of claim 6, wherein the page parameter memory structure specifies a color profile, the method further comprising loading the color profile specified in the output device description file into the page parameter memory structure.

9. The method of claim 6, wherein the page parameter memory structure specifies an engine driver associated with the selected output device, the method further comprising loading the engine driver specified in the output device description file into the generic raster image processor.

10. The method of claim 9, wherein the engine driver generates the raster image data output for the selected output device.

11. The method of claim 9, wherein the engine driver generates one or more escape sequences specific to the selected output device.

12. The method of claim 9, further comprising sending the raster image data output of the engine driver to the selected output device using an operating system service call.

13. The method of claim 1, wherein the document is associated with a final output color space with one or more final colors and the selected output device has a selected output device color space with at least one matching selected output device color, the method further comprising selecting the matching selected output device color in the output device in place of the one or more final colors.

14. The method of claim 13, wherein the color selecting step is performed using one or more device profiles.

15. The method of claim 14, wherein the color selecting step further comprises chaining one or more device profiles together.

16. The method of claim 14, wherein the profiles are ICC profiles.

17. The method of claim 14, wherein the color selecting step further comprises:
converting the color space of the document into a device independent format; and
converting the device independent format to the color space of the selected output device.

18. The method of claim 17, wherein the converting the device independent format to the color space of the selected output device step uses a profile associated with the selected output device.

19. The method of claim 1, wherein the second memory buffer is a spooler buffer, and wherein storing the generated raster image data output in a second memory buffer includes storing the generated raster image data in the spooler buffer to free the application from having to wait for the selected output device to accept the Taster image data output.

20. The method of claim 1, wherein passing the print stream includes storing the print stream including the customization command in a first memory buffer shared by the print driver and the generic raster image processor.

21. A computer program tangibly stored on a computer-readable medium comprising instructions to:
provide a generic raster image processor and a printer driver in a host computer;
receive a print request from an application, the print request designating a selected output device;
generate a print stream in response to the print request, the print stream containing a description of how a document will appear when printed including one or more of text to appear on a document, fonts to be used on a document, and graphics and line art to be included on a document;
the printer driver being operable to access device information about the selected output device from an output device description file associated with the selected output device, to generate a customization command to configure the generic raster image processor for the selected output device based on the device information, and to inject the customization command into the print stream prior to the print stream being passed to the generic raster image processor;
store the print stream including the customization command in a first memory buffer shared by the print driver and the generic raster image processor;
pass the print stream including the customization command to the generic raster image processor; and
the generic raster image processor being operable to consume the print stream including the customization command from the first memory buffer, to load an engine driver specified by the customization command, and to generate raster image data output for the selected output device; and
store the generated raster image data output in a second memory buffer for further processing or until the generated image data output can be sent to the selected output device.

22. The computer program of claim 21, wherein the print stream is generated by the printer driver.

23. The computer program of claim 21, wherein the print stream is generated by an application.

24. The computer program of claim 21, wherein the device information includes color conversion characteristics.

25. The computer program of claim 21, wherein the device information includes engine driver information about the engine driver.

26. The computer program of claim 21, wherein the generic raster image processor has a rendering engine, the computer program further comprising instructions for causing the processor to:
generate a page parameter memory structure for the selected output device; and
configure the rendering engine using the page parameter memory structure.

27. The computer program of claim 26, wherein the raster image data output for the selected output device is generated using the configured rendering engine.

28. The computer program of claim 26, wherein the page parameter memory structure specifies a color profile, the computer program further comprising instructions to load the color profile specified in the output device description file into the page parameter memory structure.

29. The computer program of claim 26, wherein the page parameter memory structure specifies an engine driver associated with the selected output device, the computer program further comprising instructions to load the engine driver specified in the output device description file into the generic raster image processor.

30. The computer program of claim 29, wherein the engine driver generates the raster image data output for the selected output device.

31. The computer program of claim 29, wherein the engine driver generates one or more escape sequences specific to the selected output device.

32. The computer program of claim 29, further comprising instructions to send the raster image data output of the engine driver to the selected output device using an operating system service call.

33. The computer program of claim 21, wherein the document is associated with a final output color space with one or more final colors and the selected output device has a selected output device color space with at least one matching selected output device color, the computer program further comprising instructions to select the matching selected output device color in the output device in place of the one or more final colors.

34. The computer program of claim 33, wherein the color select instructions operate on one or more color profiles.

35. The computer program of claim 34, wherein the color select instructions chain one or more color profiles together.

36. The computer program of claim 34, wherein the profiles are ICC profiles.

37. The computer program of claim 34, wherein the color select instructions further comprise instructions for causing the processor to:
  convert the color space of the document into a device independent format; and
  convert the device independent format to the color space of the selected output device.

38. The computer program of claim 37, wherein the instructions for converting the device independent format to the color space of the selected output device uses a profile associated with the selected output device.

39. The computer program of claim 21, wherein the second memory buffer is a spooler buffer, and wherein the instruction to store the generated raster image data output in a second memory buffer includes an instruction to store the generated raster image data in the spooler buffer to free the application from having to wait for the selected output device to accept the raster image data output.

40. The computer program of claim 21, wherein the instructions to pass the print stream include instructions to store the print stream including the customization command in a first memory buffer shared by the print driver and the generic raster image processor.

41. A system for printing a print stream, the system comprising:
  a host computer;
  a generic raster image processor and a printer driver in the host computer;
  means for receiving a print request from an application, the print request designating a selected output device;
  means for generating a print stream in response to the print request, the print stream containing a description of how a document will appear when printed including one or more of text to appear on a document, fonts to be used on a document, and graphics and line art to be included on a document;
  the printer driver being operable to access device information about the selected output device from an output device description file associated with the selected output device, to generate a customization command to configure the generic raster image processor for the selected output device based on the device information, and to inject the customization command into the print stream prior to the print stream being passed to the generic raster image processor;
  means for storing the print stream including the customization command in a first memory buffer shared by the print driver and the generic raster image processor;
  means for passing the print stream including the customization command to the generic raster image processor; and
  the generic raster image processor being operable to consume the print stream including the customization command from the first memory buffer, to load an engine driver specified by the customization command, and to generate raster image data output for the selected output device; and
  means for storing the generated raster image data output in a second memory buffer for further processing or until the generated raster image data output can be sent to the selected output device.

42. The system of claim 41, wherein the first memory buffer is controlled by a status indicator for indicating to the host raster image processor that the memory contains data of the print stream.

43. The system of claim 42, wherein the status indicator is a Windows operating system message.

44. The system of claim 42, wherein the status indicator is a flag.

45. The system of claim 44, wherein the flag is a memory location in a Macintosh operating system.

46. The system of claim 41, wherein the means for passing the print stream include means for storing the print stream including the customization command in a first memory buffer shared by the print driver and the generic raster image processor.

* * * * *

UNITED STATES PATENT AND TRADEMARK OFFICE
CERTIFICATE OF CORRECTION

PATENT NO. : 6,809,833 B1
DATED : October 26, 2004
INVENTOR(S) : Peter S. MacLeod, Peter Mierau and Stuart R. Blair It is certified that error appears in the above-identified patent and that said Letters Patent is hereby corrected as shown below:

Column 8,
Line 52, delete "and";

Column 9,
Line 52, delete "the" after "wherein"
Line 62, delete "Taster" and replace with -- raster --;

Column 10,
Line 33, insert -- raster -- before "image".

Signed and Sealed this

First Day of February, 2005

JON W. DUDAS
*Director of the United States Patent and Trademark Office*